July 29, 1952  P. DE V. D'AVAUCOURT  2,604,883
WIRE SAW STRAND AND METHOD OF MAKING THE SAME
Filed Feb. 17, 1949
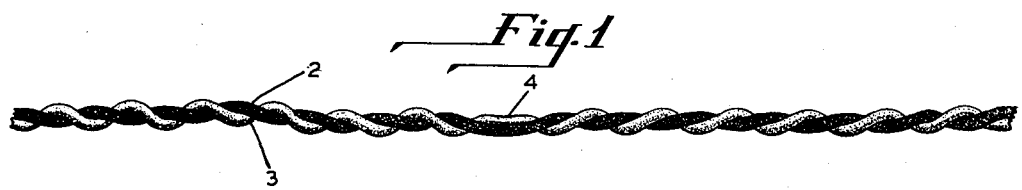
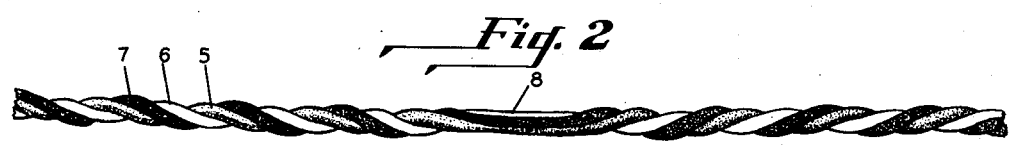
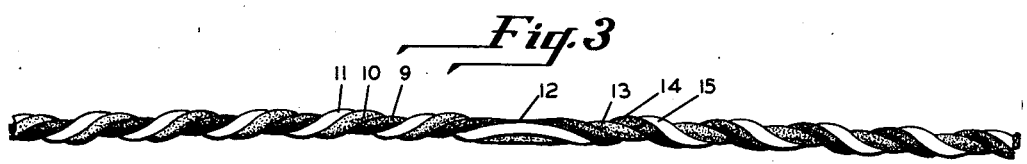
Inventor
PIERRE de VITRY D'AVAUCOURT
Attorney Patented July 29, 1952

2,604,883

UNITED STATES PATENT OFFICE 2,604,883

WIRE SAW STRAND AND METHOD OF MAKING THE SAME

Pierre de Vitry D'Avaucourt, Bainbridge, Pa.

Application February 17, 1949, Serial No. 76,996

10 Claims. (Cl. 125—12)

The present invention relates to the manufacture of wire saw strand and more particularly, to a twisted wire saw strand formed of a plurality of wires preferably so twisted that adjacent portions are of opposite hand.

In the sawing of stone, coal, and the like, wire saws are frequently used. With wire saw strands formed of a plurality of intertwisted wires, the service life is limited because the abrasive-carrying capacity of the strand is limited and is reduced quite rapidly as the strand wears in service. As a result the strand soon reaches a point where its abrasive-carrying capacity is too small for economical cutting. The speed of cutting depends to a large measure upon the abrasive-carrying capacity of the wire, and any improvement in the carrying capacity of the wire is beneficial.

In the multiple wire saw strands commonly employed, the wires all terminate in the periphery of the wire and are all of the same hardness and wear-resistance characteristics in order to provide for uniform wear in the strand.

It is an object of the present invention to provide a wire saw strand formed of a plurality of intertwisted or interwound wires, at least one of the wires being disposed at the periphery of the strand to constitute the principal abrasive-carrying portion of the strand, thus increasing substantially the abrasive-carrying capacity of the strand. Another object of the invention is to provide a wire saw strand in which the abrasive-carrying portion is formed of a wire or wires, the hardness of which or the tensile strength of which may be greater than the hardness or tensile strength or both of the base or carrying wire. An additional object of the invention is to provide an economical method of wire saw strand formation which will provide a strand having a higher cutting speed and longer service life than the usual multiple wire saw strands.

Further objects of the invention will appear upon consideration of the following description of certain preferred embodiments of my invention, shown in the attached drawing, in which the figures represent short sections of saw strand in elevation.

Referring first to Figure 1, there is illustrated a saw strand composed of a plurality of intertwisted or interwound wires 2 and 3, the wire 2 constituting the base or foundation wire and the wire 3 constituting the wear-taking wire. It will be observed that the portion to the right of the midsection 4 has a twist in one direction and the portion to the left thereof has a twist in the opposite direction. As is well known in the wire saw strand field, such reverse twisting is a desirable feature and serves to avoid the creation of any reaction within the wire which would tend to cause it to sever irregularly and not along a straight line. Each section may be of substantial extent. For example, a wire saw strand of the type shown in Figure 1 may be composed of two strands of piano wire having a tensile strength of 200,000 pounds per square inch and each wire being of 2.5 mm. gauge. The length of adjacent portions, twisted in opposite hands, may be 125 feet.

It will be observed by reference to Figure 1 that the wear-taking strand 3 has a relative twist which is greater than the twist of the base wire 2 by an amount which is sufficient to project the wear-taking or conveying wire to the periphery of the strand, although both of the wires are preferably of the same size and also of round or circular cross section. The wires may be of different cross-sectional shape, if desired, but for most commercial sawing, round wires are preferred.

In the operation of a wire saw strand, common practice is to apply an abrasive such as sand, steel shot, artificial abrasive, and the like in a carrier and coolant, preferably water, to the wire in the zone of the cut and the saw strand is effective for conveying the abrasive over the stone or the material to be cut and sawing is effected by an abrading action. The speed of cutting is dependent to a large measure upon the abrasive-carrying capacity of the strand, and by having the conveying wire disposed at the periphery of the strand with the adjacent turns spaced apart, as shown in Figure 1, the carrying capacity of the wire is increased to a substantial extent over the same size wires formed into a strand in the conventional manner, with the wires having identical twists, and sawing is greatly facilitated.

Since the wire 3 constitutes the major wear-taking portion of the strand, it may be formed of a material which has greater wear resistance than the wire 2. This will usually result in the wire 3 having a greater hardness and possibly a greater tensile strength than the wire 2.

I found that by having the two wires formed of different hardness materials, it is possible to rapidly form the wire into a saw strand with the harder wire having a greater relative twist than the base wire by heating the conveying wire which is the harder and running the base wire at normal temperatures during the twisting operation. This will result in the harder wire having a relatively greater twist than the base wire, as shown in Figure 1.

In Figure 2, there is illustrated a modification of the present invention, in which there is provided a three-wire strand having a base or foundation strand 5 and two conveying or wear-taking strands 6 and 7, all of the strands being intertwisted from a central portion 8, the portion to the left of the central portion being of one hand and the portion to the right of the central portion being of the opposite hand. In this embodiment, as in embodiment 1, the wires are intertwisted in such manner that the wires 6 and 7 have a relative twist greater than the relative twist of the wire 5 and thus the wires 6 and 7 are disposed at the periphery of the strand. It will be observed by reference to Figure 2 that the wire 7 has a greater relative twist than the wire 6 and it, therefore, extends further into the periphery of the strand than does the wire 6. The turns of each wire are spaced apart and provide large abrasive-carrying capacity in the composite strand.

The wires 5, 6 and 7 are preferably of the same size and are also preferably round in cross section. There may be minor differences in size, such differences being occasioned within normal manufacturing tolerances.

In order to compare this with a conventional three-wire saw strand, tests were made with two comparable strands, one a $\frac{7}{16}''$ diameter strand made in accordance with invention as embodied in Figure 2, and another of similar gauge of commercial three-wire saw strand. Both were run under identical conditions at 20 lineal feet per second in marble with a sand slurry as abrasive. In an average of four cuts each, the commercial strand cut at the rate of 2.21 square feet per hour and the strand of Figure 2 at 4.28 sq. ft. per hour. The wire of the invention cuts twice as fast as commercial wire and, as pointed out above, it lasts much longer because of its increased abrasive-carrying capacity.

The wires 5, 6 and 7 may have different hardnesses and different tensile strengths; and, as pointed out above, in connection with Figure 1, if the body wire 5 is softer than the wires 6 and 7, it will be necessary to heat the wires 6 and 7 during the twisting operation in order to facilitate the disposition of the wires 6 and 7 at the periphery.

Figure 3 discloses a further modification of my invention in which there is a base wire 9 and two conveying and wear-taking wires 10 and 11 disposed in the periphery of the strand. In this embodiment the wires 10 and 11 have substantially the same relative twist. This may be compared with the wires 6 and 7 of Figure 2 which have different relative twists. The wires 10 and 11 have a sufficiently greater twist than the base wire 9 to project the wires 10 and 11 to the periphery of the strand.

The strand of Figure 3, like the strands of the other figures, includes a central portion 12 with a portion of one hand to the right of the central portion and a portion of the opposite hand to the left of the central portion. The wires are shown as being round in section and of approximately the same size. In this embodiment, the wires all have the same physical properties and it is not necessary, therefore, to have any particular wire constitute the base wire so long as the two conveying and wear-taking wires have a greater relative twist so as to be disposed at the periphery of the strand. In fact, it will be observed that the wire 9 which constitutes the base wire in the portion to the left of the midsection 12 is displaced and the base wire 13 of the right-hand portion is a continuation of the conveying wire 10 of the left-hand portion. Wires 14 and 15 on the right-hand portion correspond to wires 9 and 11, respectively, of the left-hand portion. This has been portrayed by shading of the wires in the drawing.

In the drawing, the strands have all been shown by shading in order to clearly show the disposition of the various wires constituting the strand, but it will be understood that the wires may all be formed of the same material of the same hardness and tensile strength or they may be formed of different materials of different hardness or tensile strength or both. Where they are all of the same material, as in Figure 3, no special care need be exercised in fabrication, for any wire may constitute the base wire and the same is true of the conveying wire or wires.

Figure 4 shows a strand similar to Figure 3 but in which the base wire 16 and the conveying wires 17 and 18 extend both to the right and left of the midsection 19. It is preferred with this structure to have the wires 17 and 18 of the same size, shape and hardness, so as to facilitate the formation of the strand with the wires 17 and 18 having the same relative twist. It will be observed that the abrasive-carrying capacity of the strand of Figure 4 is substantially greater than would normally be obtained if all of the strands were of the same relative twist. In this structure as in Figure 3, the wear resistance of the strand is improved by reason of having a greater surface area of material which must be worn away prior to a reduction in the abrasive-carrying capacity of the strand which would make it impractical to continue its use.

It should be observed that in all of the structures shown, the wires are intertwisted or interwound helically with the diameter of the helix of one wire being greater than the diameter of the helix of another wire and that the turns or convolutions of the greater helix are spaced apart. In other words, the wire 3, for example, in Figure 1, is not wound helically with the adjacent turns in contiguous relationship. The same is true of the wires 6 and 7 in Figure 2. The wires 10 and 11, 14 and 15 in Figure 3 and the wires 17 and 18 of Figure 4 are spaced with respect to the base strand, although they are in contiguous pairs.

While for most purposes a two or three-wire strand will be found wholly satisfactory, for some special uses, it may be desirable to have a strand composed of more than three wires, but in each instance, it will be necessary in order to secure the benefits of this invention to have at least one of the wires constituting the strand having a relative twist greater than that of one or more of the other wires constituting the strand by an amount sufficient to project the wire or wires having the greater relative twist to the periphery of the strand, whether the strand be formed of two, three or more wires.

While I have illustrated and described certain preferred embodiments in my invention, it will be understood that the same is not limited thereto but may be otherwise embodied and practiced within the scope of the following claims.

I claim:

1. A saw strand for use in loose abrasive sawing comprising a plurality of wires, two at least of which are of substantially the same size and are interwound helically around each other along a substantially common axis to form intertwined convolutions, the diameter of the helix of one of said two wires being greater than the diameter of the helix formed by any other wire, the convolutions of the larger helix being spaced apart to increase the abrasive carrying capacity of the strand.

2. A saw strand for loose abrasive sawing consisting of a plurality of wires, all of which are of substantially the same size and are interwound around each other along a substantially common axis to form intertwined convolutions, the diameter of the helix of one wire being greater than the diameter of the helix of another wire and the convolutions of the larger helix being spaced apart to increase the abrasive carrying capacity of the strand.

3. A saw strand for use in loose abrasive sawing consisting of two wires of substantially the same size which are interwound helically around each other along a substantially common axis to form intertwined convolutions, the diameter of the helix of one wire being greater than the diameter of the helix of the other wire and the convolutions of the larger helix being spaced apart to increase the abrasive carrying capacity of the strand.

4. A saw strand for use in loose abrasive sawing comprising a plurality of wires, two at least of which are of substantially the same size and which are interwound helically around each other along a substantially common axis to form intertwined convolutions, the diameter of the helix of one of said two wires being greater than the diameter of the helix formed by any other wire, the larger helix being formed from a wire that is harder than the wire of the smaller helix and has its convolutions spaced apart to increase the abrasive carrying capacity of the strand.

5. A saw strand for loose abrasive sawing consisting of a plurality of wires, all of which are of substantially the same size and are interwound around each other along a substantially common axis to form intertwined convolutions, the diameter of the helix of one wire being greater than the diameter of the helix of another wire and the convolutions of the larger helix being spaced apart to increase the abrasive carrying capacity of the strand, adjacent portions of said strand being wound in opposite hand.

6. A saw strand for use in loose abrasive sawing comprising a plurality of wires, two at least of which are of substantially the same size and are interwound helically around each other along a substantially common axis to form intertwined convolutions, the diameter of the helix of one of said two wires being greater than the diameter of the helix formed by any other wire, the convolutions of the larger helix being of circular cross section and spaced apart to increase the abrasive carrying capacity of the strand.

7. A saw strand for use in loose abrasive sawing consisting of three wires of substantially the same size, one of said wires constituting a base wire and the other two of said wires constituting conveying wires, said wires being interwound helically around each other along a substantially common axis to form intertwined convolutions, the diameter of the helix of the conveying wires being greater than the diameter of the helix of the base wire, said conveying wires having their convolutions spaced apart along the said base wire.

8. A method of making saw strand from wire including a base wire and at least one conveying wire, the base wire being softer than the conveying wire, the steps comprising heating the conveying wire to a temperature above the temperature of the base wire and intertwisting the wires and imparting a relative twist to the conveying wire greater than that of the base wire to project the conveying wire into the periphery of the strand.

9. A method in accordance with claim 8 in which the twisting is effected in opposite hands from a point between the adjacent portions.

10. A method of forming a saw strand composed of a plurality of round wires of substantially the same cross-sectional area to dispose a plurality of said wires in the periphery of said strand above a wire constituting the base wire, the steps comprising maintaining the temperature of the wires to be disposed in the periphery at a temperature above the temperature of the base wire and intertwisting the wires while in heated condition.

PIERRE DE VITRY D'AVAUCOURT.

REFERENCES CITED

The following references are of record in the file of this patent:

UNITED STATES PATENTS

| Number | Name | Date |
|---|---|---|
| 379,535 | Hewitt | Mar. 13, 1888 |
| 626,621 | L'Hoir et al. | June 6, 1899 |
| 2,359,090 | Dyer | Sept. 26, 1944 |

FOREIGN PATENTS

| Number | Country | Date |
|---|---|---|
| 100,621 | Germany | Dec. 31, 1897 |
| 188,835 | Germany | June 19, 1906 |
| 364,924 | France | June 13, 1906 |